Aug. 27, 1968    L. R. WALLER    3,398,805
LIQUID DISPENSER
Filed May 23, 1966    3 Sheets-Sheet 1
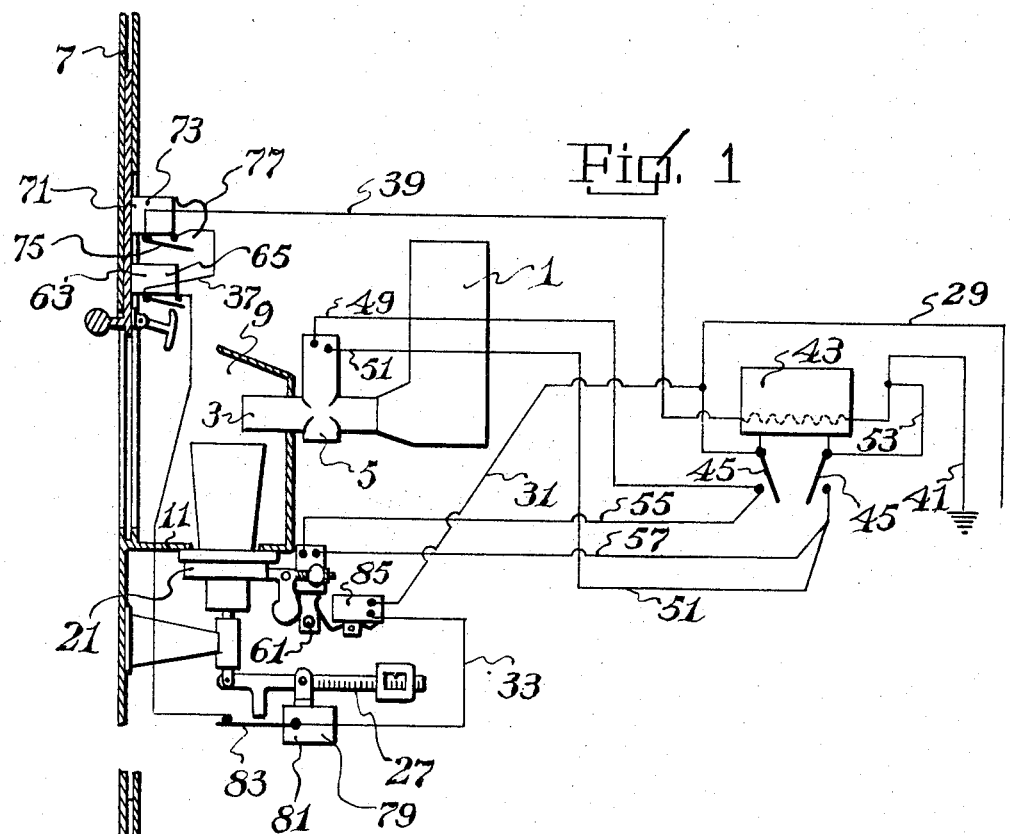
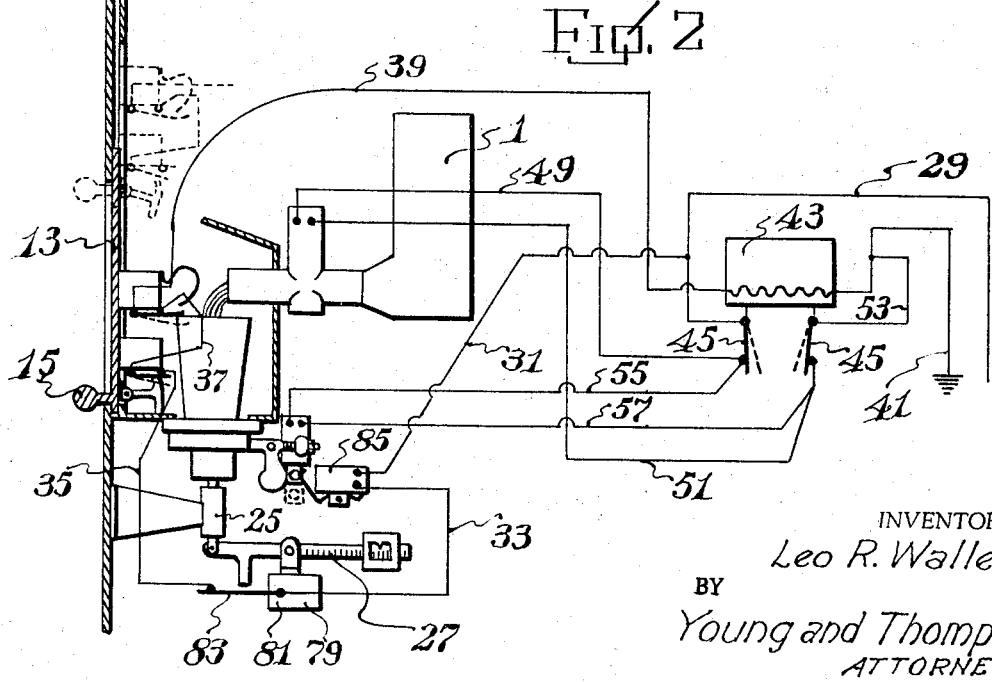
INVENTOR.
Leo R. Waller
BY
Young and Thompson
ATTORNEYS.

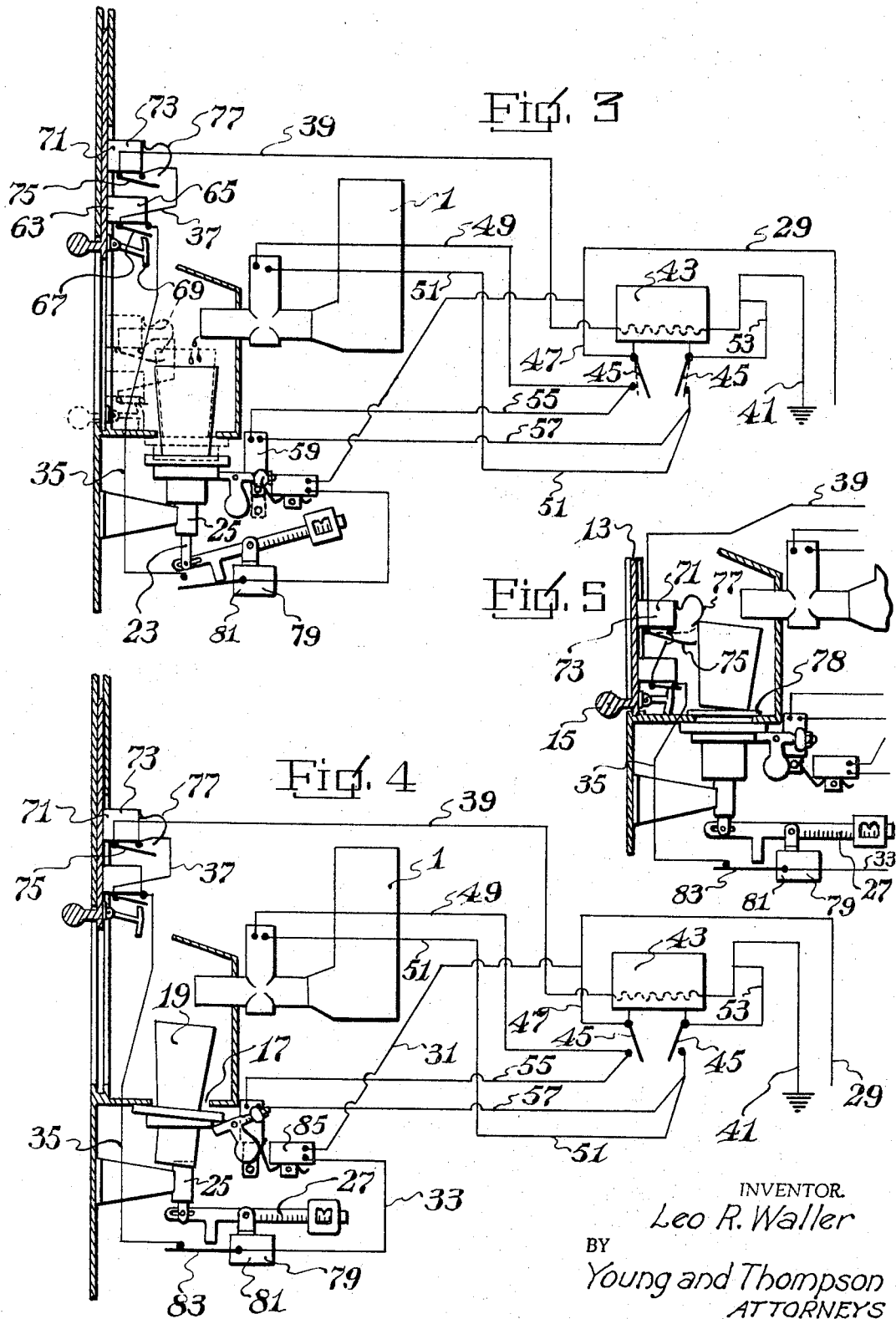

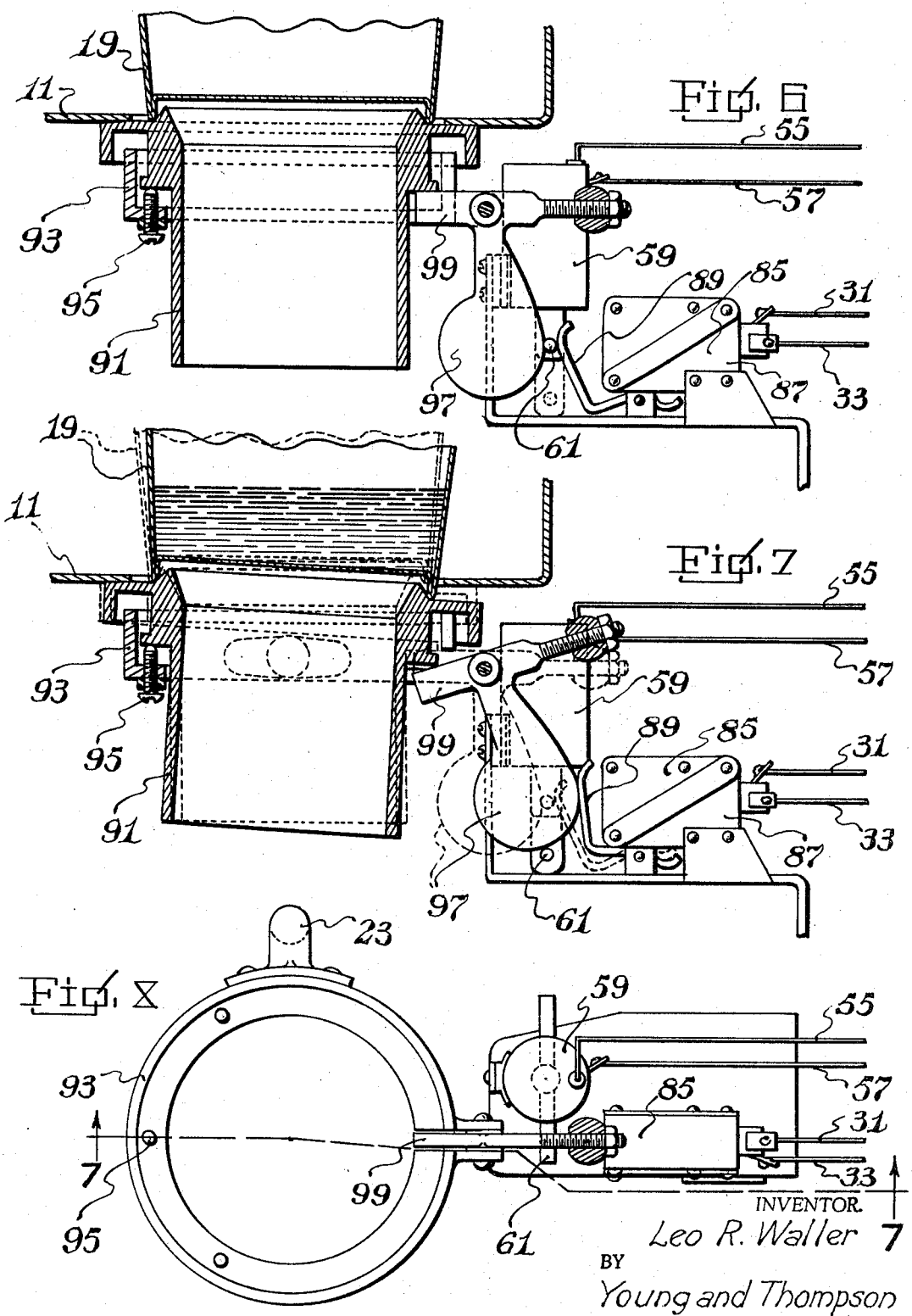

United States Patent Office 3,398,805
Patented Aug. 27, 1968

3,398,805
LIQUID DISPENSER
Leo R. Waller, 1229 N. Rosedale,
Tulsa, Okla. 74127
Filed May 23, 1966, Ser. No. 551,998
3 Claims. (Cl. 177—80)

ABSTRACT OF THE DISCLOSURE

A beverage dispenser has various cheat-proof features, including circuit arrangements that guard against cheating by the use of unauthorized containers of the wrong size or weight, or cheating by the use of mispositioned containers or partially filled containers.

---

The present invention relates to liquid dispensers, more particularly of the type adapted to dispense a measured quantity of liquid into a portable container.

It is an object of the present invention to provide a liquid dispenser having automatic controls for regulating the dispensing of measured quantities of liquid under proper or authorized conditions.

Another object of the present invention is the provision of a liquid dispenser having means to prevent cheating.

Finally, it is an object of the present invention to provide a liquid dispenser which will be relatively simple and inexpensive to manufacture, easy to install, operate, maintain and repair, and rugged and durable in use.

Other objects and advantages of the present invention will become apparent from a consideration of the following description, taken in connection with the accompanying drawings, in which:

FIGURE 1 is a schematic side view of a dispenser according to the present invention, when a portable container has just been placed in position to receive a measured quantity of liquid;

FIGURE 2 is a view similar to FIG. 1 but showing the parts in the position they occupy during dispensing;

FIGURE 3 is a view similar to FIGS. 1 and 2, but showing the parts in the position they occupy at the end of dispensing, prior to removal of the filled container;

FIGURE 4 is a view similar to FIGS. 1-3, but showing what happens when a certain attempt to cheat is made;

FIGURE 5 is a fragmentary view similar to FIG. 4, showing what happens when another attempt to cheat is made;

FIGURE 6 is an enlarged fragmentary cross-sectional view showing the parts in the position they occupy during dispensing;

FIGURE 7 is a view similar to FIG. 6 but showing the parts in the position of FIG. 4, taken on the line 7—7 of FIG. 8; and FIGURE 8 is a top plan view of a portion of the structure shown in FIG. 6.

Referring now to the drawings in greater detail, there is shown apparatus according to the present invention, comprising a dispenser 1 of known construction, having an outlet 3 from which a measured quantity of liquid may be dispensed. A valve 5 is electrically operable, as will be described in detail later, to open and close outlet 3. Dispenser 1 is housed in a cabinet 7 which is provided with a filling station in the form of a chamber 9 having a floor 11 and a vertically slidable door 13 operated by grasping a handle 15.

Floor 11 has an opening 17 therethrough, for the accommodation of a portable receptacle 19 such as a paper cup or the like. The means for supplying the receptacles 19 is no part of the present invention. They may drop from a controlled supply within the cabinet, by mechanisms well known in this art, or they may be supplied by the consumer or may be housed in a dispenser external to the cabinet, or provided in other ways.

Similarly, the manner of authorized operation of this machine is subject to wide variation and is no part of the present invention. Ordinarily, of course, these machines are coin operated; but they can also be controlled by a cashier or operated in other ways. Such coin operation or the like, and the associated equipment, is quite conventional and forms no part of the present invention and need not be further discussed here.

Receptacle 19 rests on a platform indicated generally at 21. Platform 21 comprises a vertical rod 23 which is reciprocable lengthwise in a vertical sleeve 25 fixed to cabinet 7. A balance beam 27 is provided, with an adjustable sliding weight so that the weight can be accurately predetermined which will cause platform 21 to drop. By adjustment of balance beam 27, it is thus possible to predetermine the quantity of liquid which will be contained in receptacle 19 at the time that platform 21 drops.

In general, the operation of the device is that when an authorized receptacle 19 is resting on platform 21 and door 13 is closed, valve 5 will open to permit liquid to be dispensed into receptacle 19 until a predetermined weight of liquid has been dispensed, whereupon platform 21 will drop and valve 5 will close off the supply of liquid. Thereafter, the door may be opened and the filled receptacle removed.

In order to achieve this operation, the following electrical circuitry is provided:

A power lead 29 provides electrical power from a source (not shown). From lead 29 a circuit can be completed through conductors 31, 33, 35, 37, 39 and 41 to ground. Completion of this circuit energizes a coil 43 which closes contacts 45, which in turn permits the completion of a circuit through conductors 47, 49, 51, 53, 55 and 57. Completion of this latter circuit opens valve 5 and also energizes a solenoid 59 having a stop 61 which moves from the position of FIG. 1 to the position of FIG. 2 upon energization of solenoid 59.

In order for these circuits to be completed so as to permit the device to dispense, it is necessary that several switch means be closed. A first switch means 63 is provided which senses the open and closed door position. It comprised a switch 65 having a movable contact 67 with a movable switch operator 69 secured to the door so that when the door is closed, switch operator 69 will be raised from the position of FIG. 1 to the position of FIG. 2 and will contact movable contact 67 to close switch 65. Switch 65 is therefore open in the open door position and closed in the closed door position, and is in circuit between conductors 35 and 37.

A second switch means 71 is provided which is responsive to the presence of an authorized receptacle in the filling station, that is, a receptacle whose upper rim is of the proper height. Second switch means 71 comprises a switch 73 having a movable contact 75 and a cam 77. When door 13 is closed, movable contact 75 will contact the upper rim of a receptacle of authorized height, which will close switch 73. But if the receptacle is of more than authorized height, then cam 77 will contact the upper rim of the receptacle and will tilt the receptacle to the position of FIG. 5, so that it no longer contacts movable contact 75, whereupon switch 73 will remain open. Switch operator 69 and cam 77 are so positioned that cam 77 will have tilted an improper receptacle out of the way before switch operator 69 permits 65 to close upon closing the door. Therefore, in the case of an improper receptacle, there will be no dispensing at all.

By "improper receptacle" is meant not only a receptacle different from an authorized receptacle, but also a receptacle in which it is attempted to get more than an authorized quantity of liquid, by propping up the receptacle so that it cannot fall with the platform 21. One way of doing this would be to insert a plate 78 on floor 11 covering opening 17, and then to place the receptacle on that plate. The presence of the plate, however, would raise the upper rim of the receptacle too high, whereupon cam 77 would prevent this attempt at cheating.

Third switch means 79 is also provided which is responsive to the fall of the platform 21 to open the circuit and discontinue dispensing. Third switch means 79 includes a switch 81 and a movable contact 83 which is adapted to be contacted by a portion of balance beam 27.

A fourth switch means 85 is also provided, which can open the circuit and terminate dispensing, comprising a switch 87 having a movable contact 89. In order to actuate movable contact 89, platform 21 is comprised in part by a sleeve 91 which is supported by a ring 93 by means of set screws 95 which contact an under surface of a portion of sleeve 91. On the other side of sleeve 91, a swinging weight 97 is carried by ring 93 and has an arm 99 on which an under surface of sleeve 91 rests. Sleeve 91 is thus supported for pivotal movement relative to the rest of platform 21 on set screws 95 which can be used for leveling or other purposes; and the other or swinging side of sleeve 91 is supported by a weight whose upward thrust on sleeve 91 is adjustable much in the manner of balance beam 27. When door 13 is closed, a circuit can be completed through solenoid 59 to raise stop 61. When stop 61 is raised, as in FIG. 6, weight 97 cannot swing and sleeve 91 cannot tilt and receptacle 19 is accordingly maintained upright during authorized filling. But when door 13 is opened, then solenoid 59 is deenergized and stop 61 occupies the lower position shown in FIG. 7. If there is no partially filled receptacle resting on platform 21, then sleeve 91 will not cause weight 97 to swing. But if a partially filled receptacle is replaced on sleeve 91, then sleeve 91 will tilt as shown in FIG. 7 and stop 61 will not prevent it. Movable contact 89 will be moved from the dotted line to the full line position in FIG. 7, thereby opening switch 87 to inactuate the dispensing circuit. In other words, a successful attempt to cheat cannot be made by removing the full receptacle, partially emptying it, and then replacing the partially emptied receptacle on the platform and again closing the door.

In view of the foregoing disclosure, therefore, it will be evident that all of the initially recited objects of the present invention have been achieved.

Although the present invention has been described and illustrated in connection with a preferred embodiment, it is to be understood that modifications and variations may be resorted to without departing from the spirit of the invention, as those skilled in this art will readily understand. Such modifications and variations are considered to be within the purview and scope of the present invention as defined by the appended claims.

Having described my invention, I claim:

1. Apparatus for dispensing a measured quantity of liquid into a portable receptacle, comprising means defining a filling station for a portable receptacle, said means defining a filling station including a platform, means mounting said platform for vertical swinging movement under a weight greater than the weight of an authorized empty receptacle, means for dispensing liquid into a receptacle in the filling station, an electric circuit for actuating said dispensing means, a door movable between open and closed positions selectively to provide access to the filling station, means to prevent said vertical swinging movement of the platform when the door closed, first switch means for opening said circuit when the door is open and for closing said circuit when the door is closed, second switch means for opening said circuit when no receptacle is in the filling station and for closing said circuit when a receptacle is in the filling station, a third switch means for opening said circuit when a measured quantity of liquid is in the receptacle and for closing said circuit when less than said measured quantity is in the receptacle, and fourth switch means for opening said circuit upon vertical swinging movement of said platform under a said greater weight.

2. Apparatus as claimed in claim 1, and means mounting said platform for bodily vertical movement under the weight of said measured quantity of liquid in the receptacle to open said third switch means.

3. Apparatus as claimed in claim 1, said second switch means having means engageable with the upper rim of a said receptacle to maintain said second switch means open when said upper rim is above an authorized position, said maintaining means comprising cam means for tilting a said receptacle whose upper rim is too high.

References Cited

UNITED STATES PATENTS

| | | | |
|---|---|---|---|
| 3,138,217 | 6/1964 | Bahr et al. | 177—118 X |
| 3,238,978 | 3/1966 | Frenne | 141—361 X |
| 3,329,223 | 7/1967 | Swanson et al. | 177—80 |

RICHARD B. WILKINSON, *Primary Examiner.*

GEORGE H. MILLER, JR., *Assistant Examiner.*